Feb. 22, 1927.
C. H. ALDRIDGE
1,618,259
FRICTION CLUTCH
Filed March 8, 1924　　2 Sheets-Sheet 1
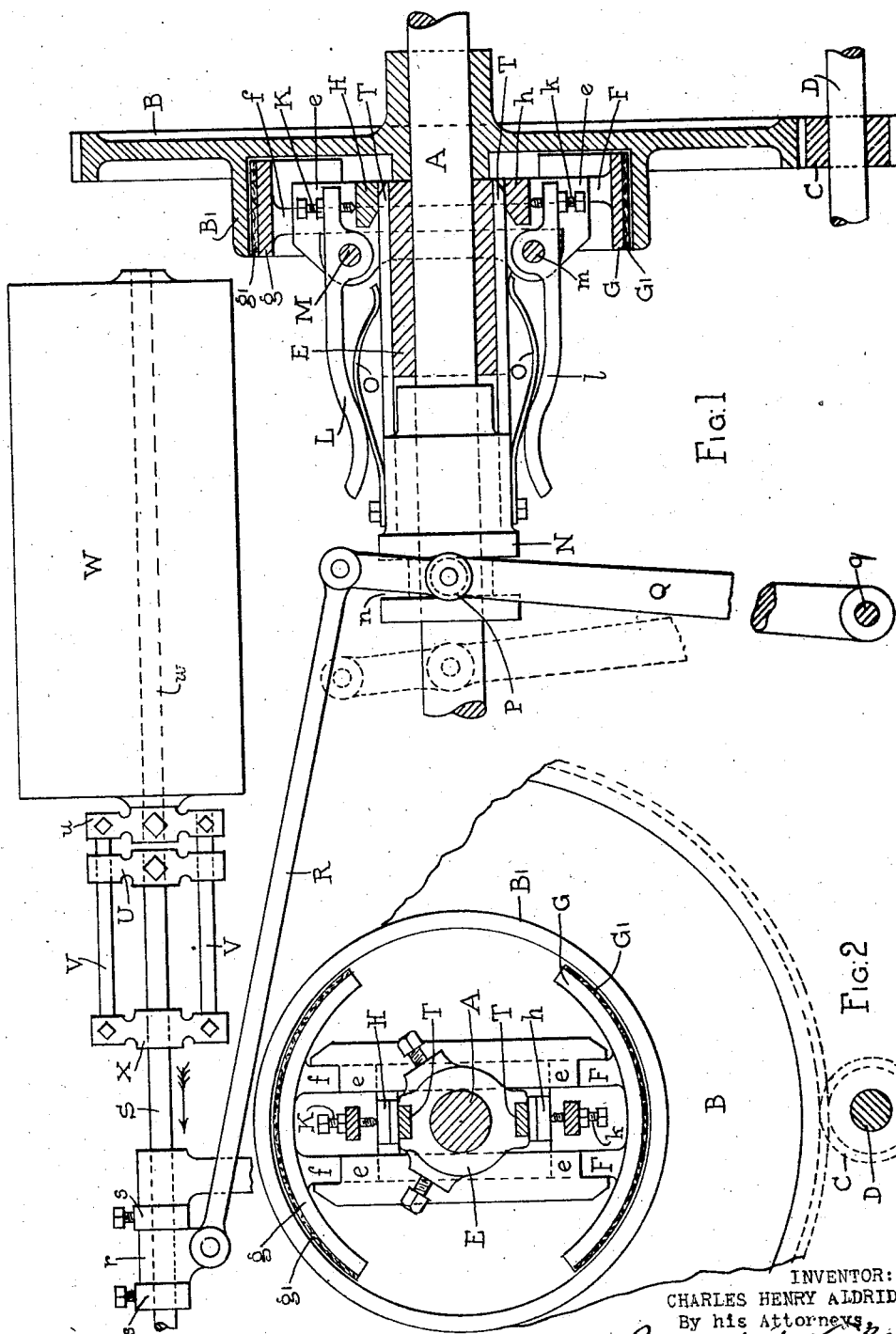
INVENTOR:
CHARLES HENRY ALDRIDGE
By his Attorneys

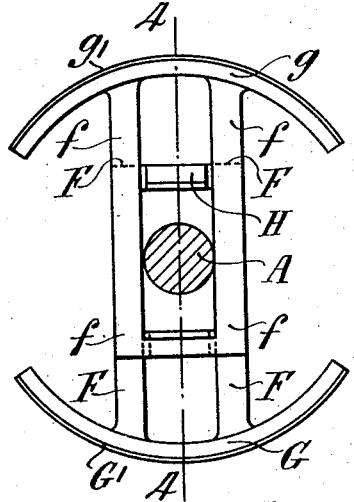
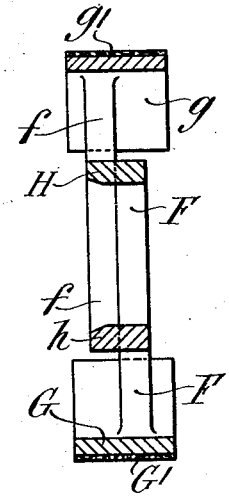
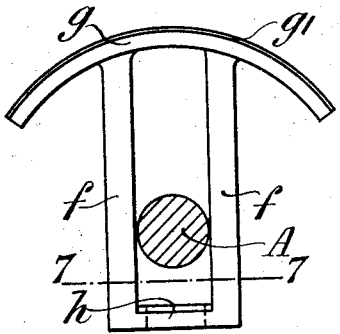
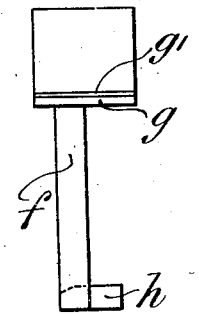
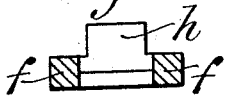

Patented Feb. 22, 1927.

1,618,259

UNITED STATES PATENT OFFICE.

CHARLES HENRY ALDRIDGE, OF LOUGHBOROUGH, ENGLAND, ASSIGNOR TO WILLIAM COTTON, LIMITED, OF PINFOLD GATE, LOUGHBOROUGH, ENGLAND.

FRICTION CLUTCH.

Application filed March 8, 1924, Serial No. 697,770, and in Great Britain August 28, 1923.

This invention relates to friction clutches and its object is to provide a clutch by which a workman when adjusting or setting a machine, especially a machine comprising a number of similar sections, such for instance as a knitting machine, may be able to apply the power as he wishes to assist him in turning the machine by hand.

My invention is illustrated by the accompanying drawing, Figure 1 of which is a sectional elevation of a clutch and the parts for operating it, while Figure 2 is a face view with certain parts removed.

Figure 3 is an end elevation showing the arms and segments.

Figure 4 is a section on the line 4—4 of Figure 3.

Figure 5 is an end elevation of one segment and its pair of arms.

Figure 6 is a side view thereof.

Figure 7 is a section on the line 7—7 of Figure 5.

A is the shaft which is to be driven and from which motion may be conveyed to the various parts of the machine. Mounted loosely upon this shaft is a gear wheel B meshing with a pinion C on a motor shaft D. On one face of the wheel B is a cylindrical flange B¹. Fast on the shaft A is a boss or sleeve E, in slots in which can move two arms F F on a segment G covered with leather G¹ adapted when the segment is suitably moved to engage the interior surface of the flange B¹ and so clutch the shaft A to the wheel B. f f are a second pair of arms on a second segment g also covered with leather g¹. On the far side of the shaft from each segment the arms of each pair F F f f respectively are connected by cross bars H h respectively and upon these bars can bear adjustable stops such as screws K k screwed into the ends of two levers L l mounted upon pivot pins M m carried by brackets e e on the boss E. N is a collar which rotates with the shaft A but can be moved endwise along it and carries two springs O O which bear against the tails of the levers L l. The collar has a circular groove n formed in it in which works a stud P on an arm Q mounted on a fixed pivot q; the end of this arm is connected by a link R to a collar r upon a rod S, the collar being prevented from moving longitudinally upon the rod by fixed collars s s clamped on the rod. Thus by moving the rod S in the direction indicated by the arrow the collar N will be moved along the shaft A and the springs O will turn the levers L l on the pins M m and the screws K k will therefore press the cross bars H h towards the axis of the shaft A and thus the segments G g will be caused to engage the flange B¹ and so the shaft A will be rotated by the wheel B.

In order that the segments may be definitely moved out of engagement with the flange B¹ when it is desired to stop the shaft A, the collar N is provided with two extensions T having bevelled ends which engage inclines on the cross bars H h and so move the cross bars outwards from the shaft as the collar N is moved to the right and therefore the segments are withdrawn from engagement with the flange.

Fast on the end of the rod S is a cross piece U sliding upon two rods V carried by a bracket X loose on the rod S and by a similar cross piece u fast on the end of the spindle w of a drum or other starter W; thus by turning the rod S by hand the spindle w may be also turned. This spindle may control in any well known way the circuits of a motor which drives the shaft D.

Thus the workman when at any point in front of a long machine can turn the rod S and so start the rotation of the wheel B, and then by moving the rod S to the left a part of the total possible endwise movement he can clutch the shaft A to the wheel B with a varying degree of grip so that power is applied to the shaft to assist him in turning it through any angle he may desire in order to move the machine for adjustment and when the rod S is moved the whole of its possible endwise movement the full grip of the clutch is brought into play and the shaft A will be driven at full speed.

What I claim is:—

1. In clutch mechanism, the combination of a shaft, a wheel loosely mounted thereon, means for rotating the wheel, a flange on the wheel, a sleeve on the shaft, a plurality of segments each adapted to engage the flange on the wheel and capable of sliding movement on the sleeve at right angles to the axis of the shaft, a plurality of levers pivoted to radial projections on the sleeve and adapted to move the segments, a collar capable of movement along the shaft, a plurality of inclines carried by the collar and adapted to turn the levers on their pivots, means for moving the collar along the shaft and means carried by the collar for moving the segments out of engagement with the flange.

2. In clutch mechanism, the combination of a shaft, a wheel loosely mounted thereon, means for rotating the wheel, a flange on the wheel, a sleeve fast on the shaft, a plurality of frames carried by the sleeve and each capable of sliding movement on the sleeve at right angles to the axis of the shaft, a segment mounted on each frame and adapted to engage the flange, a plurality of levers each pivoted on the sleeve and adapted to bear on one of the frames, a collar capable of movement along the shaft, a plurality of inclines carried by the collar and adapted to turn the levers on their pivots, means for moving the collar along the shaft, and extensions on the collar adapted to engage the frames and so to move the segments out of engagement with the flange on the wheel.

3. In clutch mechanism, the combination of a shaft, a wheel loosely mounted thereon, means for rotating the wheel, a flange on the wheel, a sleeve on the shaft, radial projections on the sleeve, a plurality of segments each adapted to engage the flange on the wheel and capable of sliding movement on the sleeve at right angles to the axis of the shaft, a plurality of levers pivoted to the radial projections on the sleeve and adapted to move the segments, a collar capable of movement along the shaft, a plurality of inclines carried by the collar and adapted to turn the levers on their pivots, means for moving the collar along the shaft, cross-bars capable of movement at right angles to the shaft, inclines on the cross-bars and extensions on the collar adapted to engage the inclines.

4. In clutch mechanism the combination of a shaft, a wheel loosely mounted thereon, means for rotating the wheel, friction clutch mechanism for connecting the wheel to rotate with the shaft said mechanism including a collar having a longitudinal movement, a rod mounted parallel to the shaft, a connection between the rod and collar whereby longitudinal movement of the rod moves the collar along the shaft and means adapted to be actuated by the rotation of the rod for controlling the means for driving the wheel.

5. In clutch mechanism, the combination of a shaft, a wheel loosely mounted thereon, means for rotating the wheel, a flange on the wheel, a sleeve on the shaft, a plurality of segments each adapted to engage the flange on the wheel and capable of sliding movement on the sleeve at right angles to the axis of the shaft, a plurality of levers pivoted to radial projections on the sleeve and adapted to move the segments, a collar capable of movement along the shaft, a plurality of spring inclines carried by the collar and adapted to turn the levers on their pivots and means for moving the collar along the shaft.

6. In clutch mechanism, the combination of a shaft, a wheel loosely mounted thereon, means for rotating the wheel, a flange on the wheel, a sleeve fast on the shaft, a plurality of frames carried by the sleeve and each capable of sliding movement on the sleeve at right angles to the axis of the shaft, a segment mounted on each frame and adapted to engage the flange, a plurality of levers each pivoted to radial projections on the sleeve and adapted to bear on one of the frames, a collar capable of movement along the shaft, a plurality of spring inclines carried by the collar and adapted to turn the levers on their pivots and means for moving the collar along the shaft.

In testimony that I claim the foregoing as my invention I have signed my name this 13th day of February, 1924.

CHARLES HENRY ALDRIDGE.